United States Patent [19]
Fils

[11] Patent Number: 5,636,261
[45] Date of Patent: Jun. 3, 1997

[54] METHOD AND DATA STRUCTURE FOR THE CONTROL OF SWITCHING CENTERS IN A TELECOMMUNICATIONS NETWORK

[75] Inventor: Henry Fils, Helsinki, Finland

[73] Assignees: Helsingin Puhelin Oy; Helsingfors Telefon AB, both of Helsinki, Finland

[21] Appl. No.: 432,709

[22] Filed: May 2, 1995

[30] Foreign Application Priority Data

May 9, 1994 [FI] Finland ................... 942147

[51] Int. Cl.$^6$ ............... H04M 3/22; H04M 15/00; H04M 7/00
[52] U.S. Cl. ............... 379/10; 379/14; 379/115; 379/219; 379/230
[58] Field of Search ............... 379/220, 221, 379/207, 115, 14, 9, 10, 230, 114, 119, 229, 219

[56] References Cited

U.S. PATENT DOCUMENTS

| | | | |
|---|---|---|---|
| 4,620,066 | 10/1986 | Bushnell et al. | 379/230 |
| 5,008,929 | 4/1991 | Olsen et al. | 379/115 |
| 5,287,498 | 2/1994 | Perelman et al. | 379/220 |
| 5,333,184 | 7/1994 | Doherty et al. | 379/230 |
| 5,434,798 | 7/1995 | Madebrink et al. | 364/514 |

*Primary Examiner*—Krista M. Zele
*Assistant Examiner*—Harry S. Hong

[57] ABSTRACT

The invention relates to a method and data structure for controlling switching centers (1, 14, 17, 19, 21, 23, 25, 27) connected to each other by a telecommunications network. The switching centers are provided with semipermanent databases containing alterable network control information related to, inter alia, call charging and routing. The information stays constant unless separately altered by an external control. Terminals (3) such as PABX connections, conventional subscriber lines, telefax equipment etc., are connected by a telecommunications network to the switching centers, and at least one service database (5) is common to the network and contains at least a portion of the network control information. According to the invention, the switching centers are controlled to update the control information stored in the semipermanent databases with information retrieved from the service database (5). The update operation of the semipermanent databases is chained so that selected switching centers of desired telecommunications networks perform sequentially the updating of their control information with information retrieved from the service database (5), whereby normally no update request message for control information need be sent to the service database (5) separately for each processed call.

24 Claims, 1 Drawing Sheet

5,636,261

METHOD AND DATA STRUCTURE FOR THE CONTROL OF SWITCHING CENTERS IN A TELECOMMUNICATIONS NETWORK

The invention relates to a method for the control of switching centers in a telecommunications network.

The invention also concerns a data structure suited for the control of switching centers in a telecommunications network.

BACKGROUND OF THE INVENTION

According to conventional techniques, the flow of control information such as charging data is typically handled individually for each switching center basis by performing the transfer of charging data separately to the charging database of each switching center. As the number of switching centers in, e.g., Finland runs into thousands, the updating of charging data is an operation requiring plenty of work.

SUMMARY OF THE INVENTION

According to the IN (Intelligent Network) standard being adopted in the art, a telecommunications network has a common SCP (Service Control Point) database of services that facilitates centralized maintenance of control information such as charging data in this service database. However, such a service database is incapable of transferring control information to the switching centers, whereby a request for control information, typically charging data, must be placed on the database every time a call is being processed. Obviously, these request messages may put an excessive load on the service database, and hence, on the telecommunications network, too.

It is an object of the present invention to overcome the drawbacks of the above-described techniques and to achieve an entirely novel method of controlling telephone switching centers.

The invention is based on primarily storing the network control information such as charging data in semipermanent databases of switching centers, while the desired changes are first made in a centralized manner in the service database and then the switching centers are controlled to update their own databases in a chained manner with the desired control information retrieved from the centralized SCP service database.

The invention offers significant benefits.

The invention avoids the time-consuming manual step of transferring control information changes. The novel control scheme is accurate and covering, and free from human error in the transfer of database information changes. Compared with, e.g., the request-based charging data update scheme of the IN system, the load on the service database remains very low thus improving the switching speed of calls. Even in the event of such extensive damage to the hardware of the service database or to the transmission path of the requested information that makes the service database inaccessible, the total telecommunications system still remains operative.

BRIEF DESCRIPTION OF THE DRAWINGS

In the following, the invention will be examined in more detail by means of exemplifying embodiments with reference to the attached drawings, in which:

With reference to FIG. 1, switching centers 1 and 27 are subscriber-level local switching centers and all the other switching centers 14, 17, 19, 21, 23 and 25 are transit switching centers, typically trunk/toll switching centers. The term switching center later in the context of this specification refers to both subscriber-level local switching centers and transit switching centers which typically are trunk/toll switching centers. The subscriber-level local switching centers 1 and 27 are interfaced to terminal equipment 3 which may comprise PABX connections, conventional subscriber lines, telefax equipment, etc.

Figure 1:
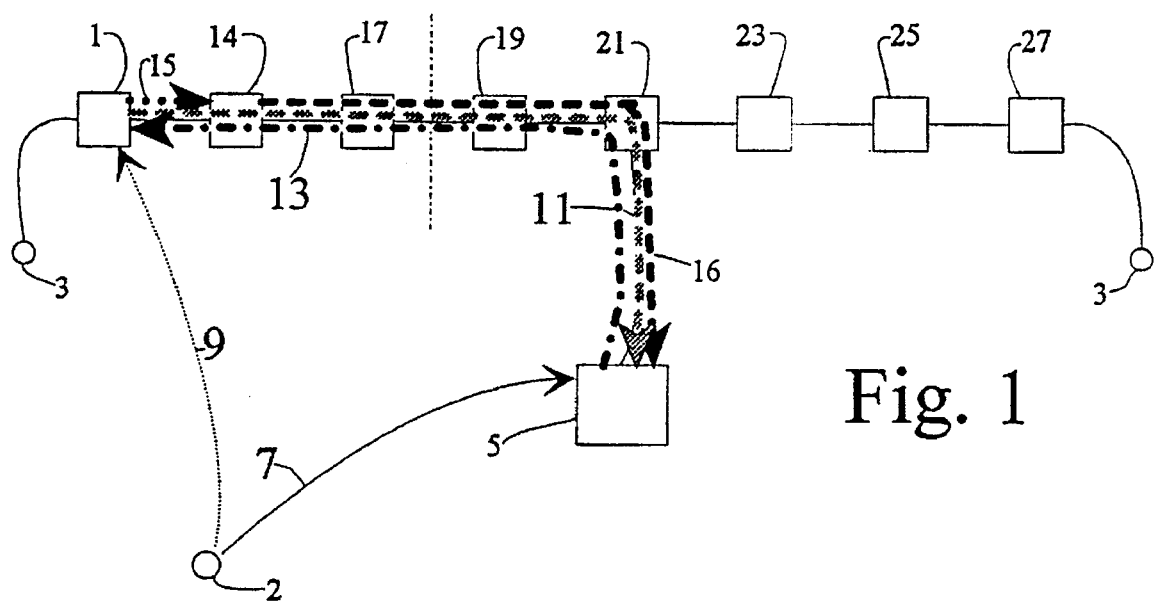
FIG. 1 is a block diagram of a telephone network suited to accommodate the application of the invention.

The service database 5 of an IN system is typically connected to the telecommunications network via a single switching center 21, whereby it can serve the entire network. A greater number of service databases 5 is also possible. The operating principle of the service database 5 is not to transfer information in a self-contained manner, but rather, to respond to request messages chiefly sent by switching centers to the database.

According to the invention, the switching centers are controlled in a centralized manner so that an authorized person 2 makes a desired change 7 in the service database, next typically the same authorized person controls 9 a first switching center 1 to call a desired secured number, e.g., a hexadecimal number, whereby the connection to said number controls the switching center 1 to request 11 the service database 5 to send a response message with information 13 comprising at least 1) information on the address of the desired data element of the semipermanent database of the switching center 1;

2) the new content of the data element to be updated, and if necessary, the old content thereof; and 3) information on the telephone number of the update chain's next switching center 14 to which the switching center 1 connects the call, sends the number received from the database and said number then activates the next switching center 14 to send a message 15 to request 16 the service database 5 to send a response message containing all the data representing the information 13. The message 15 contains the number which was entirely or partially contained in the response message (message 13). The invariable portion of the number is typically placed at the end of the number sequence, while according to the invention its place can be anywhere in the number sequence.

The number to which the call is placed is advantageously sent in hexadecimal format for security reasons to prevent access to the number from conventional telephone set either accidentally or by tampering attempts. The other reason for the use of hexadecimal numbers is to conserve the numbers of the normal dial number space. An alternative or parallel security operation against system tampering is to define a closed user group, for example, whereby the controls 7 and 9 are permissible from a certain connection only. Also alternatively or in parallel with the above-described security operations, verification of the calling party's number can be used, whereby the controls 7 and 9 are permissible from a certain number or numbers only.

The call is chained by providing the message 13 always with information on the number to be called next. Accordingly, this number contains information on the next switching center in the chain and the action to be taken. The number can be changed systematically after the interpretation of each of the messages 13, whereby the value of the number related to the next request can be used as a counter in the service database 5 or in the switching centers, permitting termination of the chained information transfer sequence when the value of the number reaches a preset value.

Information which can be updated by virtue of the addressing scheme described in this specification include such data as call charging, billing method or charging of call forwarding which information is contained in the semipermanent databases of the switching centers. Simultaneously, the method is suited for changing time information such as synchronizing the time and date information of switching centers, defining timing functions (wait times for response, dialing progress, etc.). Furthermore, the method also facilitates the control of routing and authorizing information under fault and catastrophe situations, typically required to establish a so-called authority network in conjunction with an extensive catastrophe, war, etc.

Figure 2:
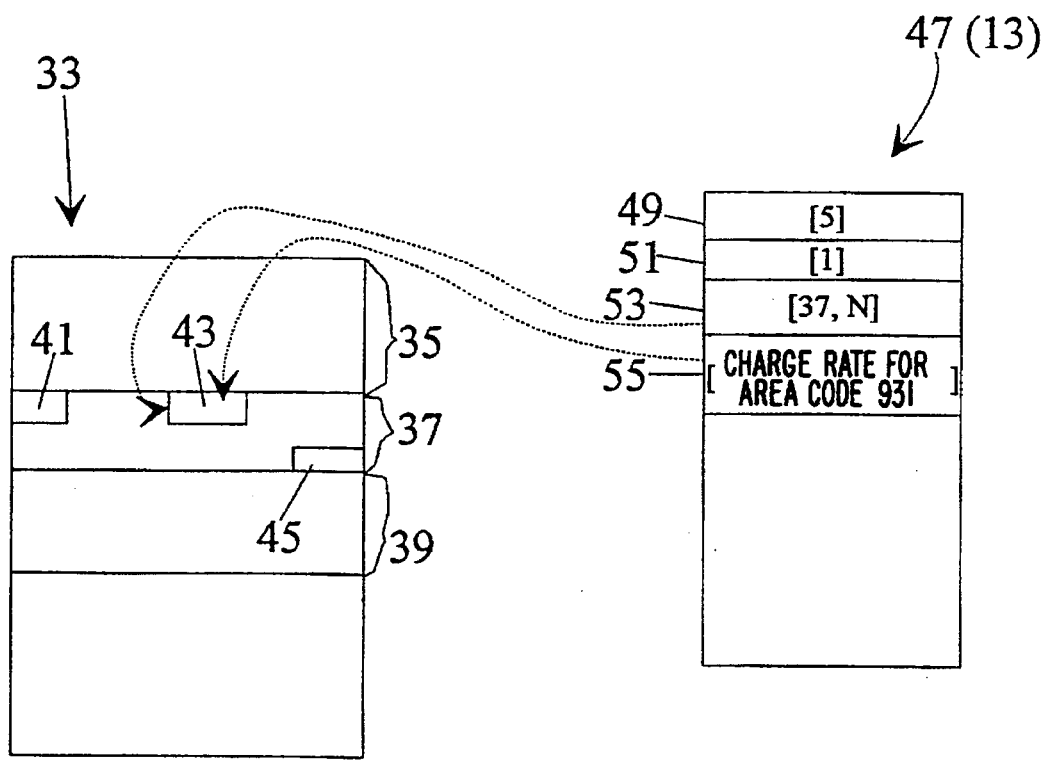
FIG. 2 is a schematic diagram of a semipermanent switching center database adapted for the control scheme according to the invention; and of a data structure according to the invention.

With reference to FIG. 2, the semipermanent database 33 of a switching center is divided with regard to its data content into groups 35, 37, 39, etc., whereby charging data can be stored in group 37, for instance. The contents of the other groups may comprise, e.g., routing, authorizing and timing data. Each group is comprised of data elements, of which the diagram illustrates within the group 37 the first data element 41, the Nth data element 43 and the last data element 45. Each data element has an unique address in the database 33. The data element 43 may contain, e.g., information on the charge rate per minute for the area code 931.

With reference to FIG. 2, the structure of the message 13, which according to FIG. 1 forms the response message, must contain indexed addresses for the contents of the semipermanent databases of switching centers complemented with the new contents, and for possible checking, the old contents at the indexed addresses.

Hence, the data structure 47 of the response message 13 illustrated in FIG. 2 can be used to, e.g., the database 33. The data structure 47 contains at least fields for message type, sender 49, receiver 51, address 53 of data element 43 to be updated and new content 55 of data element 43. Moreover, the data structure 47 may contain information on the old content of the data element 43. Obviously, checking elements are included in the data structure 47 to secure the integrity of transferred data. Accordingly, the data structure 47 can be used in accordance with the invention for updating, e.g,, the content of data element 43 of FIG. 2, wherein the charge rate per minute for area code 931 is changed in all desired switching centers.

The exemplify the invention, the fields of the data structure 47 illustrated in FIG. 2 are filled in brackets with information corresponding to the response message 13 of FIG. 1, whereby said information is used to update the data element 43 of the semipermanent database 33, wherein the sender is the service database 5, the receiver is the switching center 1, the data element address is N in the group 37 and the information to be updated is the charging rate for the area code 931.

Appendix 1 is an illustrative listing of an actual definition for the data structure according to the invention.

In the context of this specification, the term call denotes an operation in which the switching center receives a number, based on the number selects an outgoing line to which a connection is established and sends to the line at least a portion of the received number.

APPENDIX 1

Exemplifying definition of the data structure according to the invention

```
Burst ::= SEQUENCE {
        cHGvsMPM    [0] CHOICE {
                numbOfPulses    [1] INTEGER (1 . . . 255)}}
'burst' makes it possible to send a burst of pulses within each of the periods of the periodic
charging.

PulseCharging ::= SEQUENCE {
        interval                [0] INTEGER (100 . . . 3600000), -- in milliseconds
        numbOfPulsesInInterval  [1] INTEGER (0 . . . 255),
        chargeAt                [2] ENUMERATED {
                synchronous (1),
                karlsson (2)} OPTIONAL
        }
```

'chargeAt' is used for choosing either synchronous or karlsson charging. If the SSP cannot use this information, it still shall be able to receive this parameter, but ignore it.
Within the 'level' sequence the 'chargeLevel' parameter is used when a level different from the ones existing in SSF shall be used.

The 'oldLevel' parameter is used for indicating the level that should be replaced, if 'levelToUse' is sent as the second or further times within the same call.

Either one or both of the 'oldLevel' and 'chargeLevel' parameters may be present with the 'levelToUse' parameter when 'level' is used as the chargeBase choice.

```
ChargeLevel ::= SEQUENCE {
        firstPeriod      [0] PeriodCharacteristicsSet,
        nextPeriods      [1] NextPeriods OPTIONAL,
        changeGroup      [2] INTEGER (1 . . . 255),
        chargeRateIndex  [3] INTEGER (1 . . . 4)
        }
``` changeGroup, chargeRateIndex: these parameters are needed to link the information within 'ChargeLevel' to the internal structure of the SSPs' charging mechanisms. All the SSPs do not use both of these parameters, but they have to be able to receive them and ignore the unnecessary ones without any effect on the functionality.

APPENDIX 1-continued

Exemplifying definition of the data structure according to the invention

NextPeriods ::= SEQUENCE SIZE (1 . . . 3) OF PeriodCharacteristicsSet

PeriodCharacteristicsSet ::= SET SIZE (1) OF PeriodCharacteristics

```
PeriodCharacteristics ::= SEQUENCE {
        periodDuration    [0] INTEGER (-1 . . . 3600), -- in seconds, -1 means infinite duration
        burst             [1] Burst OPTIONAL,
        chargingType      [2] CHOICE {
                pulseCharging    [2] PulseCharging}
}
```

'periodDuration' indicates how long this charging period shall be used.
'burst' indicates the possible charge burst for the period.
When pulse charging should be used the 'pulseCharging' parameter indicates the charge rate for sending pulses.

I claim:

1. A method of controlling a plurality of switching centers connected to each other by a telecommunications network, the switching centers being operatively associated with databases containing alterable network control information, and at least one service database connected to the telecommunications network and containing at least a portion of the network control information, said method comprising the steps of:
controlling said switching centers to update the control information stored in the databases of said switching centers with information retrieved from said service database, wherein said controlling step controls the switching centers to request update information from the service database; and
chaining the update operation of said databases of said switching centers so that a plurality of the switching centers sequentially request update information for their associated databases from said service database.

2. A method as defined in claim 1, wherein the chaining step effectuates the sequential requests by controlling a first switching center to call a number which initiates a connection to the service database, causing the service database to respond with a message or messages which updates/update the desired information and controls/control the first switching center to call a next switching center, thereby causing the next switching center to perform the equivalent operation.

3. A method as defined in claim 2, wherein the chaining step further controls the switching centers to call a number which is varied after each call so that the value of said number acts as a counter, the sequential updating being terminated when the value of the number reaches a preset value.

4. A method as defined in claim 1, wherein said controlling step includes a transmission of a message structure containing information on indexed addresses of data elements of the databases of the switching centers together with new contents of the data element, and the old contents at the indexed addresses.

5. A method as defined in claim 1, wherein the update information includes charging data.

6. A method as defined in claim 1, wherein the update information includes routing data.

7. A method as defined in claim 1, wherein the update information includes timing data.

8. A method as defined in claim 1, wherein the update information includes time and date data.

9. A method as defined in claim 1, wherein the update information includes authorizing data.

10. A method for updating control information in a plurality of switching centers operatively associated with a plurality of information databases, the switching centers being connected to at least one service database, the method comprising the steps of:

(a) transmitting a first request message from a first one of the plurality of switching centers to one of the at least one service database, the first request message requesting an update of information stored in the information database operatively associated with the first switching center;

(b) transmitting at least one response message from the service database to the first switching center in response to the first request message, the response message including update information to be stored in the information database operatively associated with the first switching center;

(c) automatically initiating, in response to receipt of the at least one response message by the first switching center, a next one of the plurality of switching centers to transmit a next request message to one of the at least one service database, the next request message requesting an update of information stored in the information database operatively associated with the next switching center; and (d) repeating said step (c) for subsequent switching centers, whereby the subsequent switching centers are sequentially and automatically initiated to transmit respective request messages in response to a respective previous switching center receiving at least one response message, each respective request message requesting an update of information stored in the information database operatively associated with the switching center transmitting the respective request message.

11. The method of claim 10, wherein the at least one response message transmitted in said step (b) includes a number identifying the next switching center, and wherein said step (c) includes the following sub-steps:

(c-1) placing a call from the first switching center to the next switching center identified by the number, and (c-2) transmitting the next request message from the next switching center after receiving the call of said sub-step (c-1).

12. The method of claim 10, further including the generation of a number which acts as a counter controlling the number of times said step (d) repeats said step (c).

13. The method of claim 12, wherein the number is included in the response message of said step (b).

14. The method of claim 10, wherein the update information includes at least one of charging data, routing data, timing data, time and date data, and authorizing data.

15. The method of claim 10, wherein the response message further includes old data to be replaced by the update information.

16. A method for updating control information in a plurality of switching centers operatively associated with a plurality of information databases, the switching centers being connected to at least one service database, the method comprising the steps of:

(a) transmitting an update message from one of the at least one service database to one of the plurality of switching centers, the update message including update information to be stored in the information database operatively associated with the one switching center;

(b) automatically indicating to a next switching center that the one switching center has received the update message, thereby initiating the next switching center to transmit a request message to one of the at least one service database, the request message requesting an update of information stored in the information database operatively associated with the next switching center.

17. The method of claim 16, wherein said step (a) is initiated by a preceding step of:

(a-0) transmitting a first request message from the one switching center to the service database, the first request message requesting an update of information stored in the information database operatively associated with the one switching center.

18. The method of claim 16, wherein said step (a) is preceded by a step of:

(a-0) manually entering changes to data stored in one of the at least one service database.

19. The method of claim 16, further including the step of:

(c) repeating said step (b) for subsequent switching centers, such that the subsequent switching centers are sequentially and automatically initiated to transmit respective request messages in response to indications that a respective previous switching center received a response message, each respective request message requesting an update of information stored in the information database operatively associated with the switching center transmitting the respective request message.

20. A method for updating control information in a plurality of switching centers operatively associated with a plurality of information databases, each switching center being connected to at least one service database, the method comprising the steps of:

(a) transmitting a request message from a first one of the plurality of switching centers to one of the at least one service database, the request message requesting an update of information stored in the information database operatively associated with the first switching center;

(b) transmitting at least one response message from said one service database to the first switching center in response to the request message, the at least one response message including update information to be stored in the information database operatively associated with the first switching center;

(c) repeating said steps (a) and (b), whereby subsequent switching centers are respectively and automatically initiated in a sequence, each respective switching center being initiated in response to an indication that a previous switching center received a response message, to transmit a request message to the service database, the request message requesting an update of information stored in the information database operatively associated with the respective switching center.

21. The method of claim 20, wherein the at least one response message includes at least one of charging data, routing data, change timing data, time and date data, and authorizing data.

22. The method of claim 20, wherein the at least one response message includes a number, different for each response message, the number being used as a counter to control the number of time said step (c) repeats said steps (a) and (b).

23. The method of claim 20, wherein the at least one response message includes a number identifying a next switching center to be automatically initiated in the sequence.

24. The method of claim 23, wherein said step (c) includes, for the subsequent switching centers, the following sub-steps:

(c-1) placing a call from the previous switching center to the next switching center identified by the number, and (c-2) transmitting, in response to receipt of the call of said sub-step (c-1), the respective request message from the next switching center.

\* \* \* \* \*